United States Patent
Costa et al.

(10) Patent No.: US 9,521,606 B1
(45) Date of Patent: Dec. 13, 2016

(54) SYSTEMS AND METHODS FOR INTERFACING WITH A NETWORK OF MOVING THINGS

(71) Applicant: Veniam, Inc., Mountain View, CA (US)

(72) Inventors: Rui Costa, S. Joao das Lampas (PT); João Gomes, Sao Marcos (PT)

(73) Assignee: Veniam, Inc., Mountain View, CA (US)

(*) Notice: Subject to any disclaimer, the term of this patent is extended or adjusted under 35 U.S.C. 154(b) by 0 days.

(21) Appl. No.: 15/098,542

(22) Filed: Apr. 14, 2016

Related U.S. Application Data

(63) Continuation of application No. 15/088,602, filed on Apr. 1, 2016, now abandoned.

(60) Provisional application No. 62/268,188, filed on Dec. 16, 2015, provisional application No. 62/222,145, filed on Sep. 22, 2015.

(51) Int. Cl.
| | | |
|---|---|---|
| *H04L 12/28* | (2006.01) |
| *H04W 48/02* | (2009.01) |
| *H04W 64/00* | (2009.01) |
| *H04L 29/08* | (2006.01) |
| *H04W 12/06* | (2009.01) |
| *H04B 1/3822* | (2015.01) |

(52) U.S. Cl.
CPC .......... *H04W 48/02* (2013.01); *H04B 1/3822* (2013.01); *H04L 67/12* (2013.01); *H04W 12/06* (2013.01); *H04W 64/003* (2013.01)

(58) Field of Classification Search
None
See application file for complete search history.

(56) References Cited

U.S. PATENT DOCUMENTS

| | | | | |
|---|---|---|---|---|
| 8,924,459 B2* | 12/2014 | Gagne | ..................... | H04W 4/02 370/331 |
| 2003/0078053 A1* | 4/2003 | Abtin | ..................... | H04W 8/16 455/456.1 |
| 2006/0031436 A1* | 2/2006 | Sakata | ..................... | H04L 12/14 709/221 |
| 2011/0173682 A1* | 7/2011 | Perry | ..................... | H04W 12/06 726/4 |
| 2011/0307119 A1* | 12/2011 | Basir | ..................... | G07C 5/008 701/1 |
| 2013/0022031 A1* | 1/2013 | Sivertsen | ............ | H04W 84/005 370/338 |
| 2013/0145065 A1* | 6/2013 | Ricci | ..................... | G06F 9/54 710/241 |
| 2014/0040016 A1* | 2/2014 | Amla | ..................... | G09F 21/04 705/14.45 |
| 2014/0189838 A1* | 7/2014 | Zhao | ..................... | H04W 12/06 726/7 |
| 2014/0335897 A1* | 11/2014 | Clem | ..................... | G08G 1/0112 455/456.3 |

(Continued)

*Primary Examiner* — Otis L Thompson, Jr.
(74) *Attorney, Agent, or Firm* — McAndrews, Held & Malloy, Ltd.

(57) ABSTRACT

A request from a mobile access point that is installed on a vehicle may be received via network interface circuitry of one or more computing devices. Processing circuitry of the one or more computing devices may determine characteristics of a captive portal to present in response to the request based on current location of the vehicle and mobile access point. A captive portal with the determined characteristics is then provided by the processing circuitry, via the network interface circuitry, in response to the request.

53 Claims, 17 Drawing Sheets

(56) References Cited

U.S. PATENT DOCUMENTS

2015/0142947 A1* 5/2015 Dyba .................. H04L 41/0853
709/224
2015/0201438 A1* 7/2015 Adarapu ............... H04W 64/00
370/328

* cited by examiner

SYSTEMS AND METHODS FOR INTERFACING WITH A NETWORK OF MOVING THINGS

CLAIM OF PRIORITY

This application is a continuation of U.S. patent application Ser. No. 15/088,602 filed on Apr. 1, 2016, which claims priority to U.S. Provisional Application Ser. No. 62/222,145, titled "Systems and Methods for Interfacing with a Network of Moving Things," filed on Sep. 22, 2015, and U.S. Provisional Application Ser. No. 62/268,188, titled "Captive Portal-related Control and Management in a Network of Moving Things," filed on Dec. 16, 2015, each of which is hereby incorporated herein by reference in its entirety.

CROSS-REFERENCE TO RELATED APPLICATIONS/INCORPORATION BY REFERENCE

The present application is related to U.S. Provisional Application Ser. No. 62/221,997, titled "Integrated Communication Network for a Network of Moving Things," filed on Sep. 22, 2015; U.S. Provisional Patent Application Ser. No. 62/222,192 titled "Communication Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; and U.S. Provisional Application Ser. No. 62/299,269, titled "Systems and Methods for Automating and Easing the Installation and Setup of the Infrastructure Supporting a Network of Moving Things," filed on Feb. 24, 2016; each of which is hereby incorporated herein by reference in its entirety for all purposes.

BACKGROUND

Current communication networks are unable to adequately support communication environments involving mobile and static nodes. As a non-limiting example, current communication networks are unable to adequately support a network comprising a complex array of both moving and static nodes (e.g., the Internet of moving things). Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
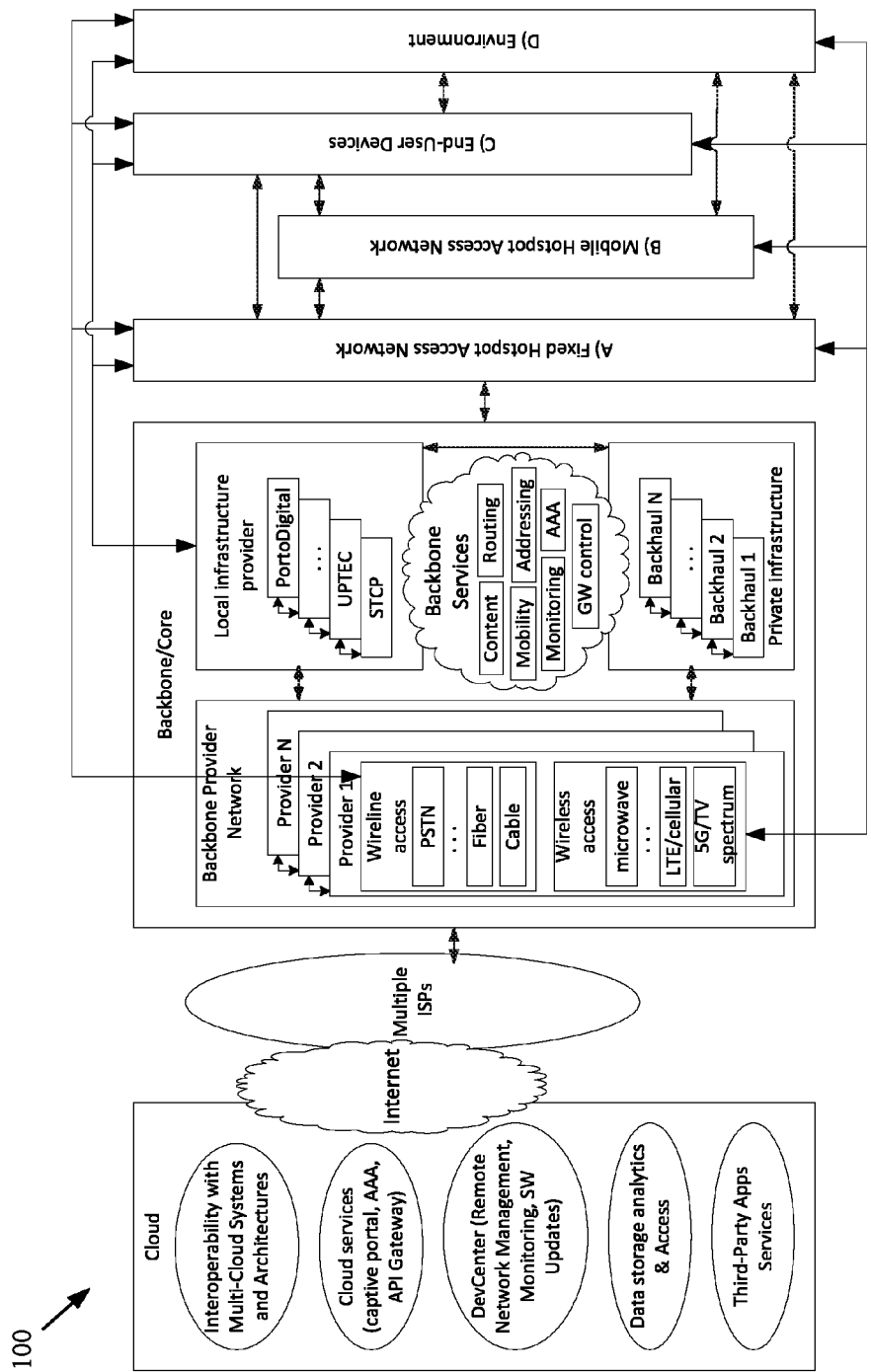
FIG. 1 shows a block diagram of a communication network, in accordance with various aspects of this disclosure.

Various aspects of this disclosure provide communication network architectures, systems and methods for interfacing with a network of moving things. As a non-limiting example, various aspects of this disclosure provide communication network architectures, systems, and methods for supporting a communication network comprising a complex array of both static and moving communication nodes (e.g., the Internet of moving things).

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set $\{(x), (y), (x, y)\}$. That is, "x and/or y" means "one or both of x and y." As another example, "x, y, and/or z" means any element of the seven-element set $\{(x), (y), (z), (x, y), (x, z), (y, z), (x, y, z)\}$. That is, "x, y, and/or x" means "one or more of x, y, and z." As utilized herein, the terms "e.g.," and "for example" set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10× the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles. Such sensors may, for example, comprise positioning sensors (e.g., GPS sensors, Galileo sensors, GLONASS sensors, etc.). Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, trucks' positions and engines' status, and then be able to provide real-time notifications to drivers (e.g., to turn on/off the engine, follow the right route inside the harbor, take a break, etc.), thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example networks and/or network components 200, 300, 400, 500-570, and 600, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors), etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
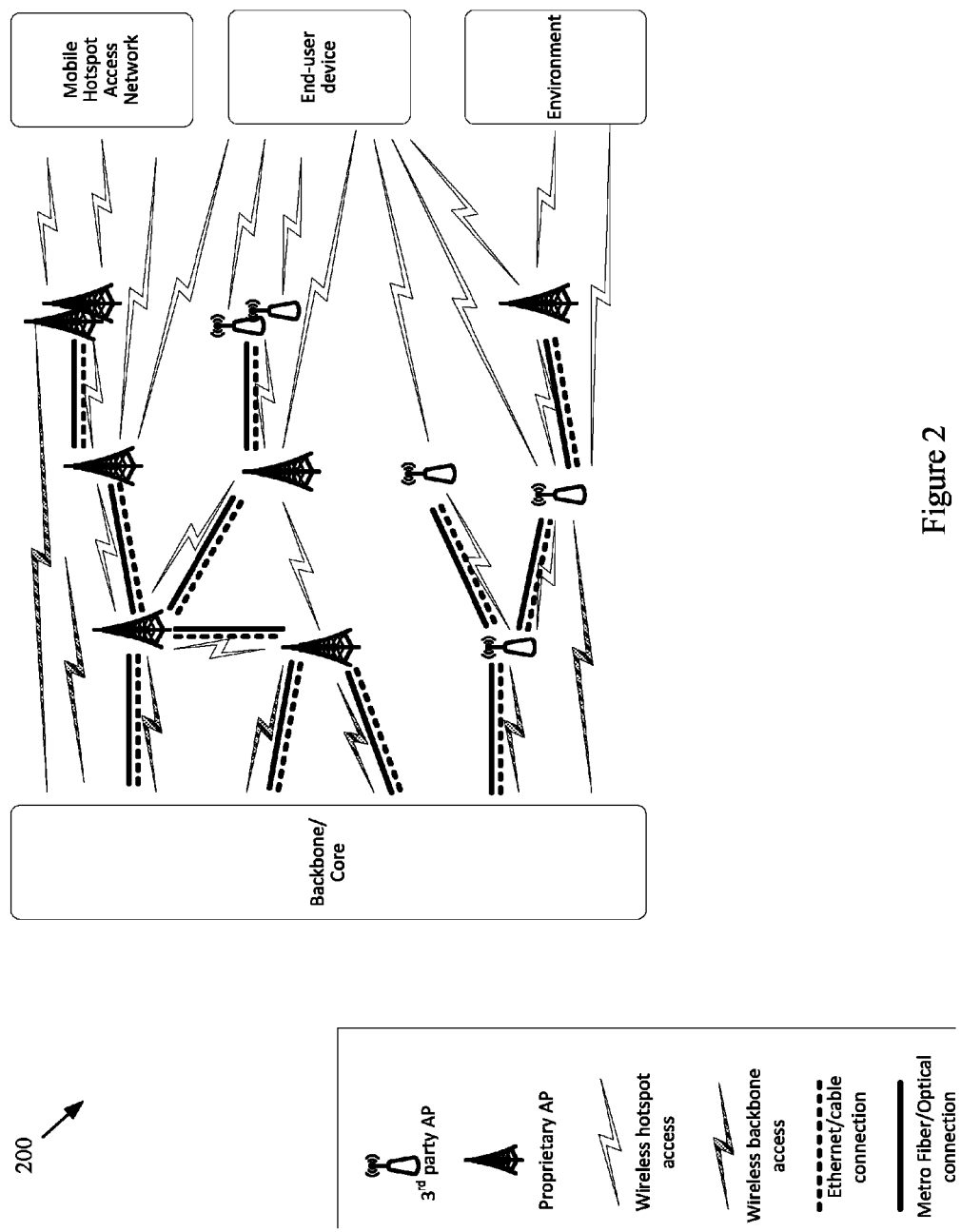
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example networks and/or network components 100, 300, 400, 500-570, and 600, discussed herein.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors; road maintenance networks, devices, and sensors; traffic management networks, devices, and sensors; advertising networks, devices and sensors; etc.).

Figure 3:
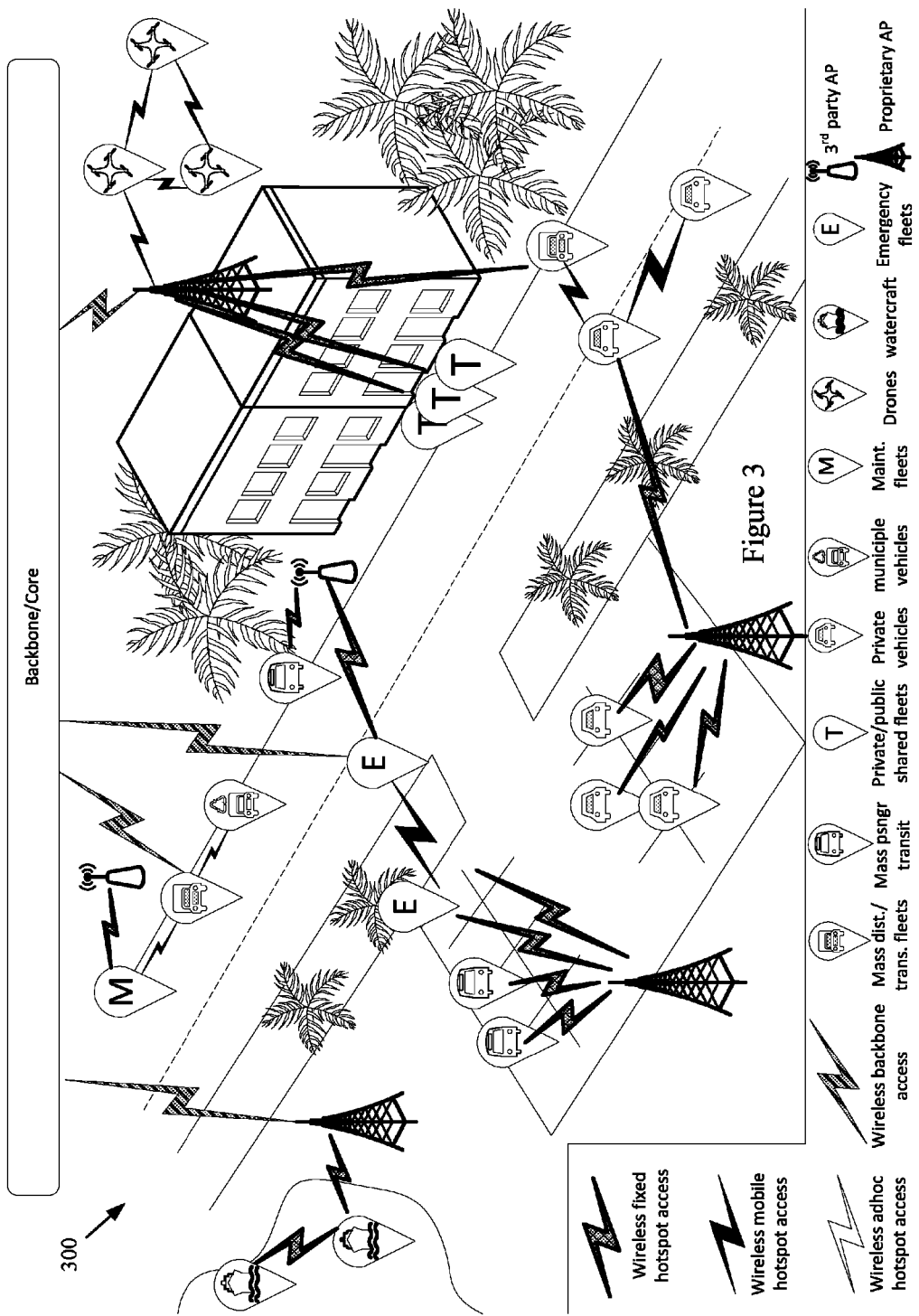
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example networks and/or network components 100, 200, 400, 500-570, and 600 discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under) water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
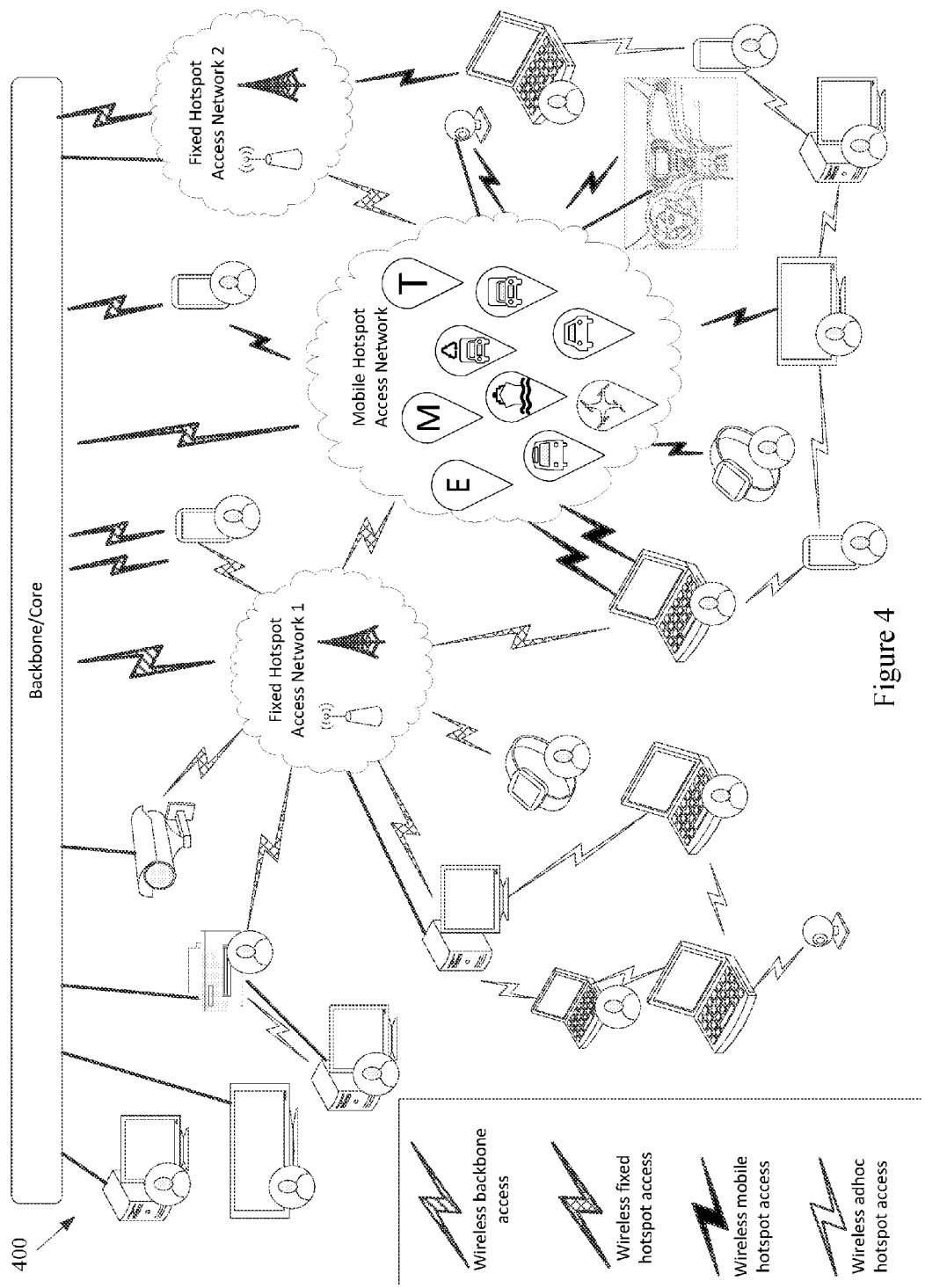
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example networks and/or network components 100, 200, 300, 500-570, and 600, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
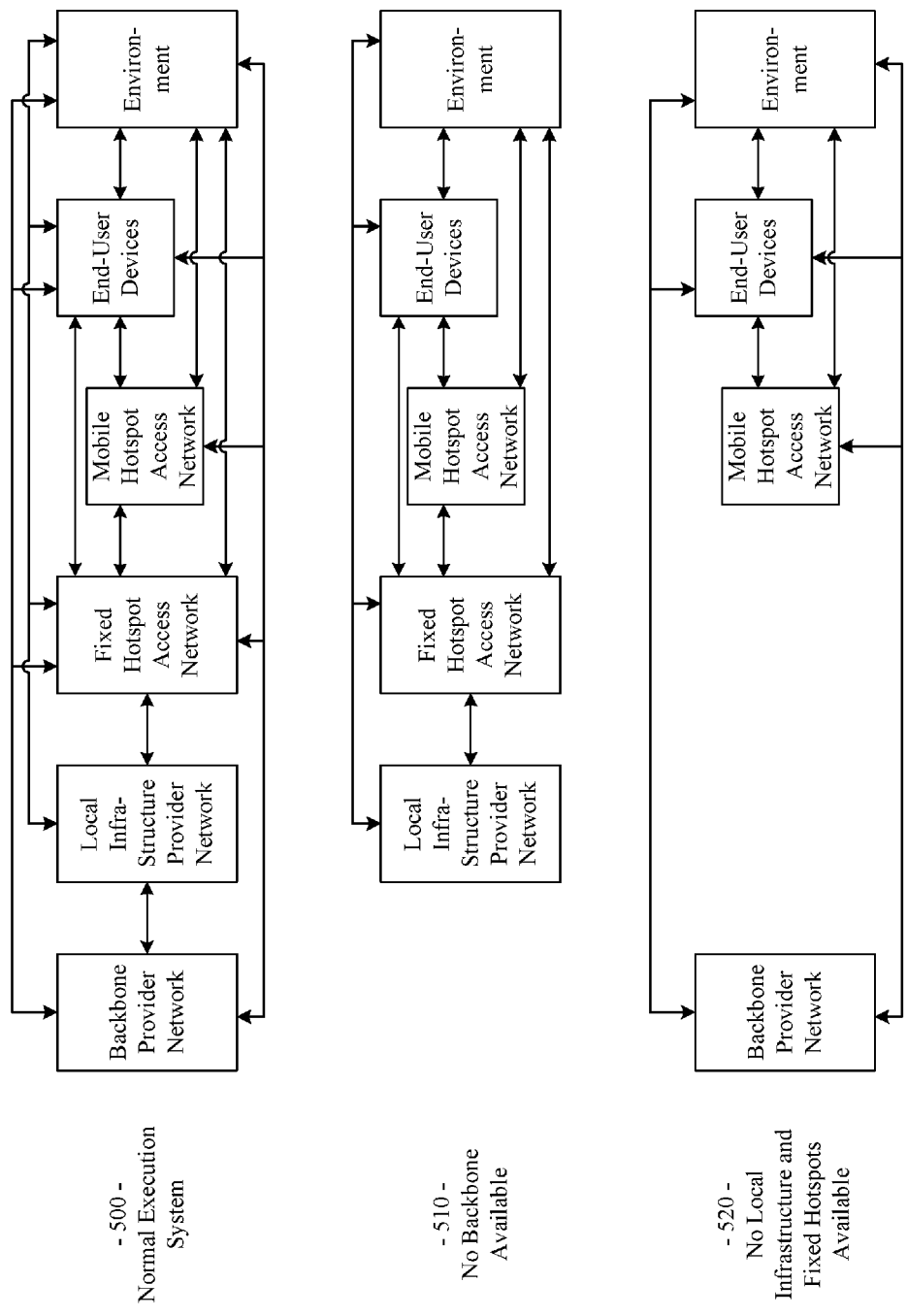
FIGS. 5A-5C show a plurality of network configurations illustrating the flexibility and/or and resiliency of a communication network, in accordance with various aspects of this disclosure.
Figure 5B:
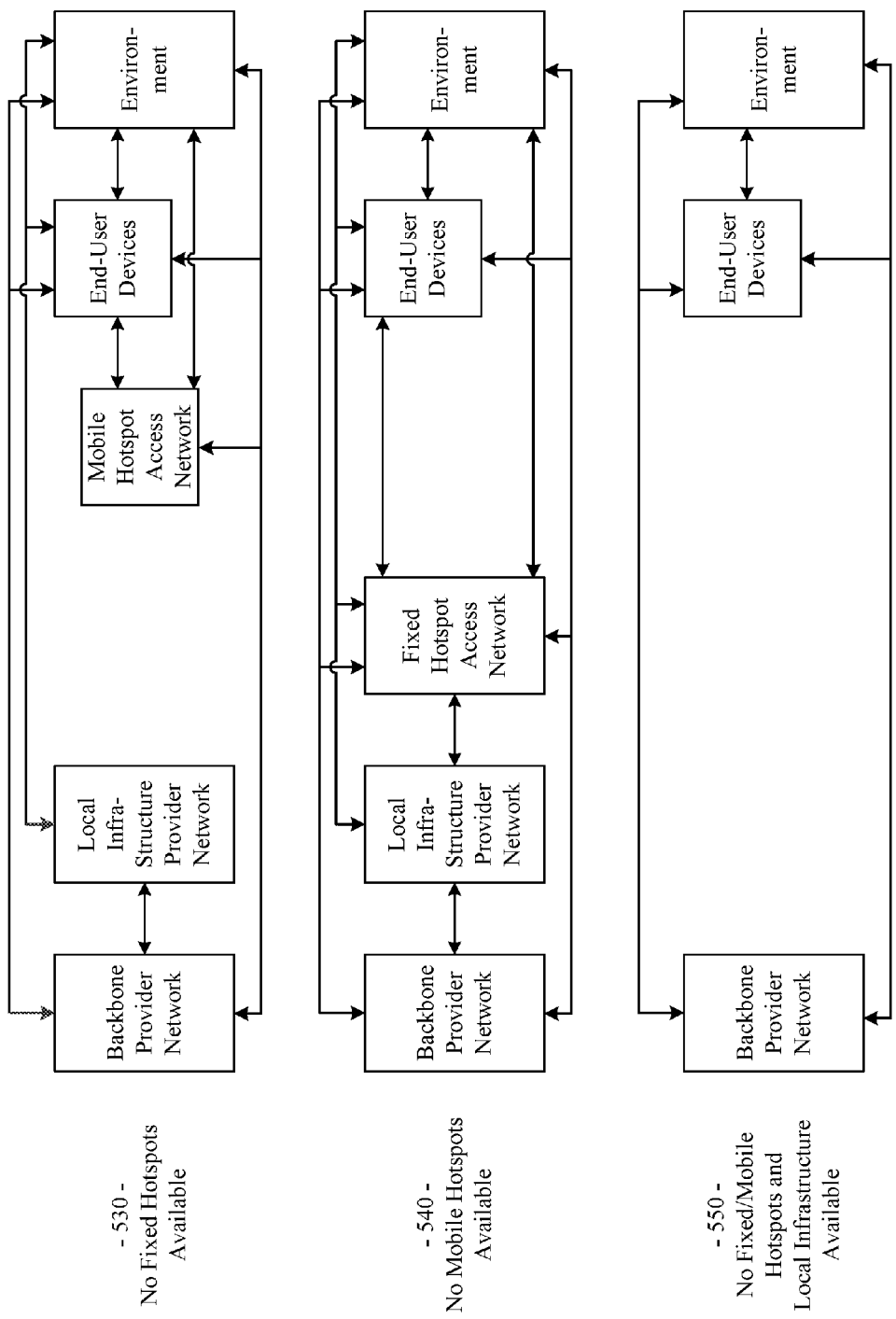
Figure 5C:
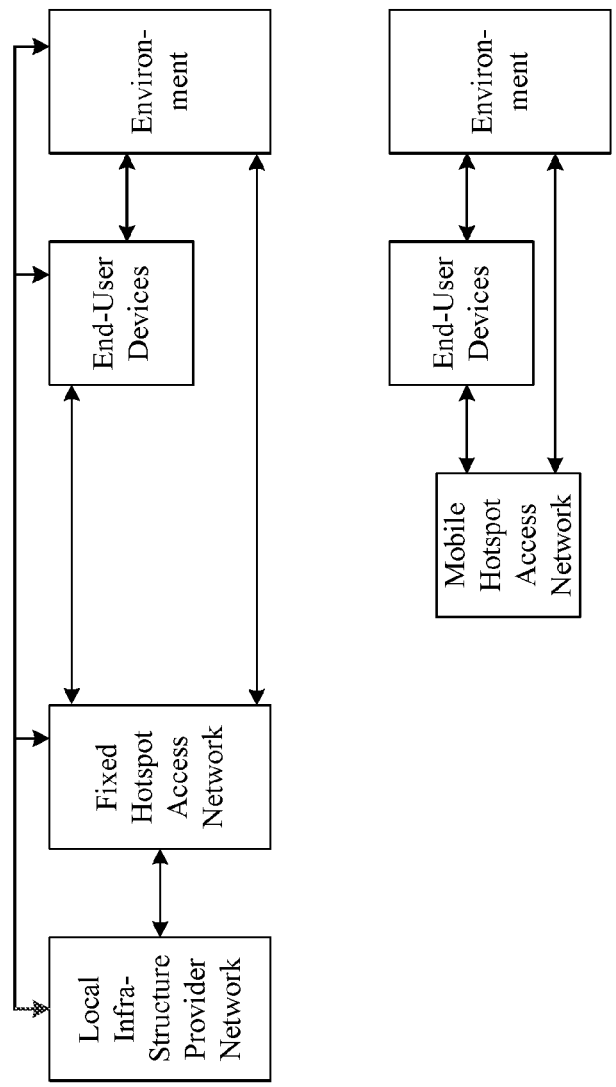

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example networks and/or network components 100, 200, 300, 400, and 600, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6A:
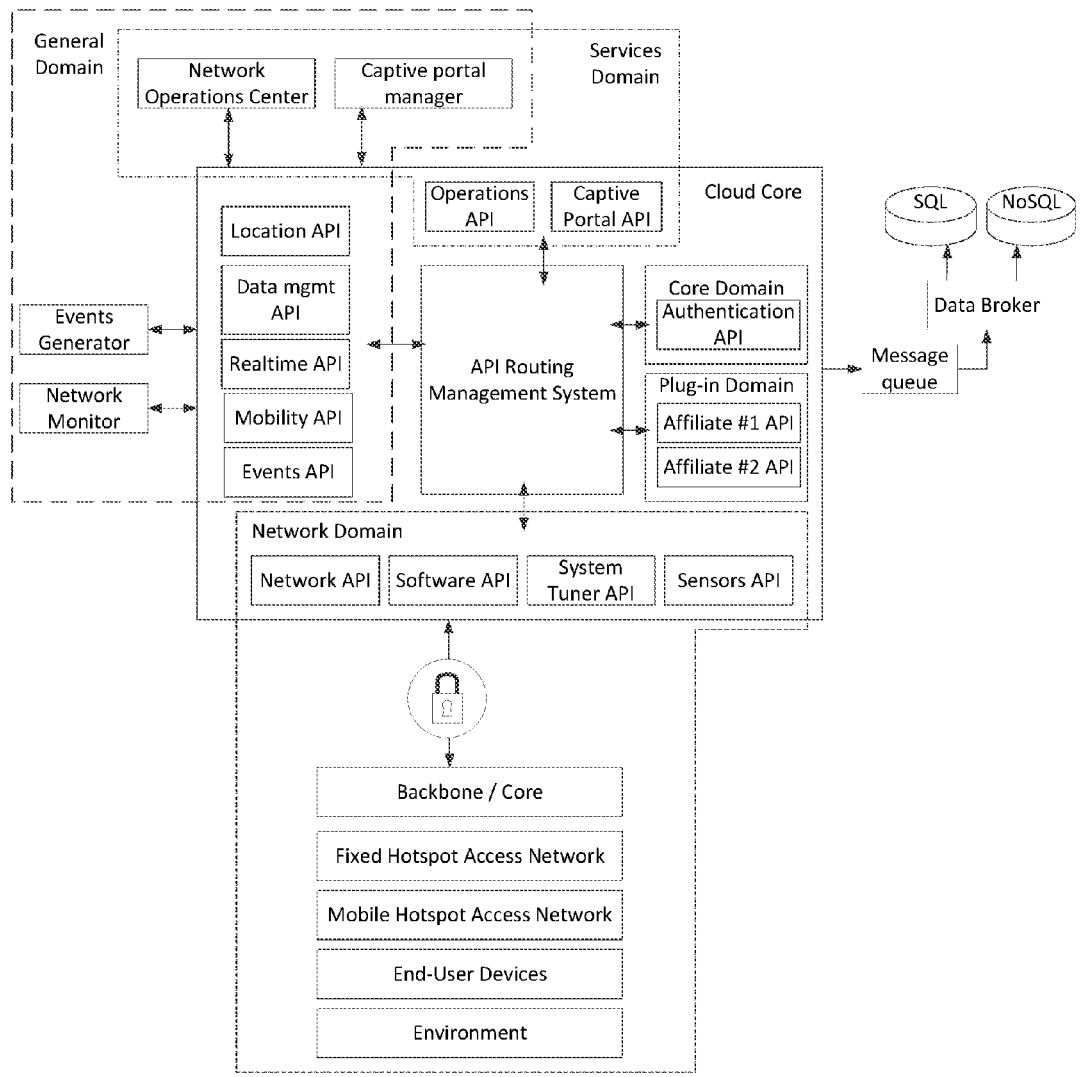
FIG. 6A shows an example implementation of the Cloud of FIG. 1.

FIG. 6A shows an example implementation of the Cloud of FIG. 1. The Cloud comprises circuitry operable to perform a variety of functions and provide a variety of services. The cloud comprises circuitry for implementing a network operations center, a captive portal manager, an events generator, a network monitor, a message queue, a data broker, and one or more databases.

The network operations center is operable to provide one or more dashboards via which logged-in users can manage and/or monitor data and services to which they have access (based on their credentials, etc.).

The captive portal manager is operable to provide a captive portal which handles tasks such as getting user credentials, validating user permissions, displaying context-aware content, and others. The captive portal is further described below.

The events generator is operable to trigger/generate events upon detecting conditions/data/etc. that an affiliate has selected to generate an event. An affiliate may be, for example, a network provider (e.g., a cellular operator, a cable television operator, a DSL operator, etc.) a content provider (e.g., Netflix, Hulu, Pandora, and the like), a business (e.g., local store, university, etc.) and/or any other third party that has entered into an agreement with the operator of the APs. For example, an event may be generated upon detection of reconfiguration of a network component, receipt of particular type of traffic, volume of traffic, number of users, users in a particular location, etc. An event being generated may result in a log being updated, an alert being sent to the affiliate, etc.

The network monitor is operable to monitor/analyze conditions in the network 100, data being generated in the network 100, etc., and generate statistics, breakdowns, reports, etc. based on the analysis.

The message queue comprises memory operable to queue data for later processing. The queue may be logically portioned into a plurality of queues each of which holds traffic of a particular type/having particular characteristics/etc.

The data broker acts as an intermediary between the databases and the message queue to determine which data to store to which database, which data to read from which database, etc. The data broker may use various QoS/prioritization rules for determining which queue to service at which time.

The database(s) may comprise relational and/or non-relational databases for storing data received by and generated in the network 100.

The cloud core comprises circuitry operable to provide a plurality of APIs and an API routing management system for interconnecting the APIs.

The Cloud may provide raw data, parsed data, dashboards for managing and monitoring the network, and/or a variety of other processes and services. The Cloud is operable to manage, monitor and operate geographically diverse vehicular networks. The Cloud may provide functionalities such as, for example: management and deployment of remote automatic software updates for vehicles and infrastructure, system-wide network configuration management, vehicular network monitoring, big data collection and storage, pre-processing of data, secure data-at-rest storage, controlled access to resources, dashboards and applications that tap into the network data and services, and generation of network and system related events. The Cloud may be configured to automatically absorb network scaling without downtime period and while keeping the existing functionalities working. The Cloud may be configured to integrate with third-party systems and to support the creation of new features without disrupting the previous system. The Cloud may be operable to run in any operating system of any cloud provider and provide mechanisms to avoid data lock-in.

The Cloud may be operable to manage and distribute remote software updates for vehicles and infrastructure. The Cloud may be operable to perform system-wide configuration management. The Cloud may be operable to trigger events related to the network, fleet, and any metrics calculated live from the data arriving at the Cloud. The Cloud may be operable to provide secure and reliable storage of data-at-rest. The Cloud may perform automatic generation of network and services analytics, and may perform automatic system and network-wide monitoring.

In a network, such as network 100 of FIG. 1, terabytes of data may be produced as a result of the vehicular networks' normal operation and metadata. The Cloud and its APIs enable different applications and services to leverage such data differently. Similarly, the Cloud and its APIs can be leveraged differently by different applications and services. The Cloud and its APIs ensure that data and resources are only accessible to the rightful person or entity without compromising the security and access of the remaining data stored in the Cloud. The Cloud and its APIs ensure that users receive fast responses to their requests while being able to access whole resources which they have requested and for which they have access to. The Cloud and its APIs may be configured such that vehicular network nodes can access resources of the Cloud which are the subject of improvement without requiring the vehicular network nodes to change their own implementations to still remain compatible. The Cloud and its APIs may enable plugging in customized and/or third-party APIs that will provide specific functionalities regarding data analysis and features access.

The APIs of the Cloud core may be globally available and respond fast to any request coming from any location in the world. The APIs may be secure and guarantee global data accessibility with access control to the rightful resources. The APIs may be backward-compatible yet easily upgradeable such that both vehicular network resources and third-party entities can access vehicular network resources and data. The APIs allow third-party entities to interact with the resources available at the vehicular network cloud.

The processes and services performed/made available by the Cloud are enabled by a plurality of secure, compartmentalized APIs, which enable: Vehicular network elements (e.g., mobile APs, fixed APs, and LMAs) to interact with the Cloud; internal cloud-based subsystems (such as the Network Operations Center, Captive Portal, Events Generator, Network Monitor, Data Broker, Message Queue, etc.) to interact with each other; end-users that want to consume public or restricted API resources to interact with the Cloud; and third-party applications to interact with the Cloud. In an example implementation of Cloud, the APIs are modularized and/or compartmentalized to allow easy upgrades on the functionalities, separate the goals of each API, and provide separately secured access to the various APIs.

In an example implementation, the API's include: an authentication API configured to provide access to authentication functionalities of the cloud for authenticating the consumers of all of APIs, and validating and granting the access to the rightful resources; a captive portal API configured to provide access to captive portal related functionalities of the cloud such as getting access to user information, validating if a bus is authorized to provide access to the Internet, etc.; a data management API configured to provide access to stored raw and pre-processed data in the cloud; a location API configured to provide access to vehicle location history and location enhancements functionalities in the cloud; a metrics API configured to provide access to pre-processed metrics regarding the network generated/stored in the cloud; a mobility API configured to provide access to mobility related metrics and functionalities, such as live traffic jam detection, street traffic intensity values, roadblock information and listing, etc.; a network API configured to provide access to vehicular network management related functionalities performed by the cloud; an operations API configured to provide access to cloud operations options such as scheduling an intervention in a vehicle, access vehicle stock and allocation, report a problem in a vehicle, etc.; a real-time API operable to provide access to real time metrics of vehicles, fleet, infrastructure and network; a sensors API configured to provide back-end compatibility with constrained application protocol (CoAP) and access to sensors data information and data; a software API configured to provide access to remote software updates management resources, providing functionalities such as launching or scheduling a software update, request a full software update, access previous software versions, etc.; and a system tuner API configured to provide access to configuration management resources/functionalities of the cloud such as scheduling and setting a new configuration to be distributed into the network, changing existing configuration parameters, getting current and past configurations set up in the network.

In an example implementation, it is possible to plug in affiliate-specific APIs that provide third-party-specific functionalities regarding data analysis and features access. These customized and/or third-party-specific APIs can be plugged in to the whole system for a limited time and easy switched on and off, if required. Managing the available APIs and which users can access which APIs is performed using multiple configurations, which allows the same system to be reused and adapted to multiple situations.

The APIs may be secured in multiple, non-exclusive ways. For example, an API user may be required to provide a valid username and password combination, provide a valid access token, and/or perform requests from a secure non-public network domain. As for the username and password combination, in an example implementation, an API consumer can either register itself to have access to the API and generate his own credentials (username and password) or the cloud can create the credentials and provide them to the intended consumer. Authorization mechanisms may rely on several different systems such as a username and password, a RADIUS server, a secure database, and delegated authentication ("oAuth"). Each of these systems may comprise several different security requirements in order to offer a reliable and secure mechanism. Username and password authorization mechanisms may be mandatory to access the Authentication API as well as other highly restricted API-available functionalities.

Figure 6B:
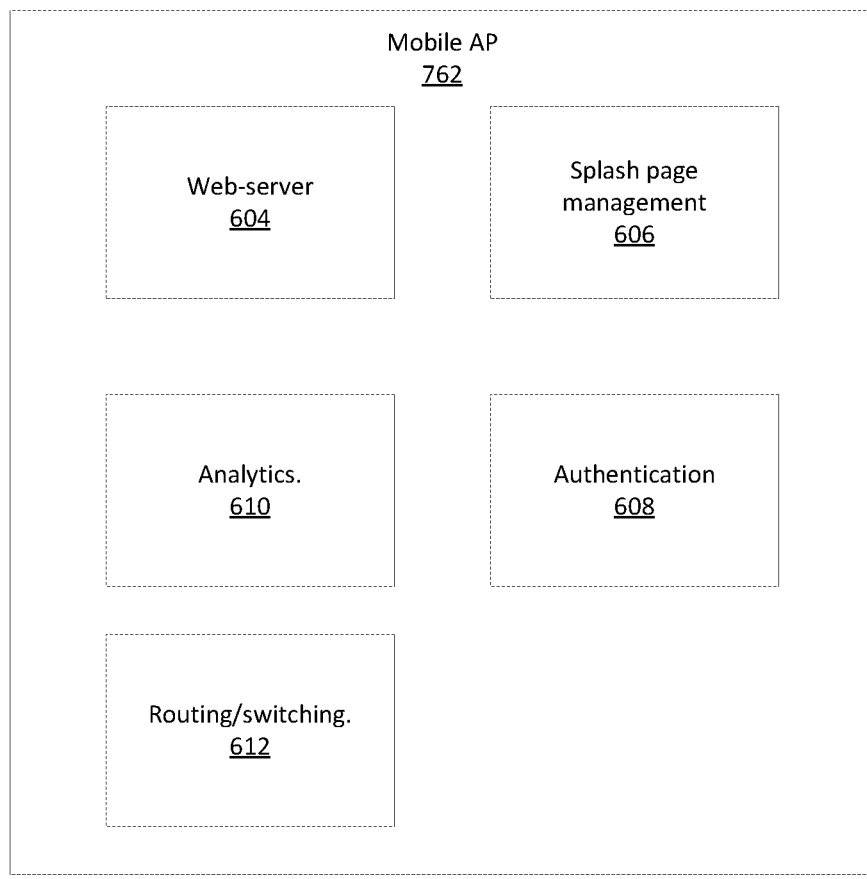
FIG. 6B shows an example implementation of a mobile AP of a FIG. 1.

FIG. 6B shows an example implementation of a mobile AP of FIG. 1. The mobile AP 762 comprises circuitry 604 configured to implement a web-server, circuitry 606 configured to manage splash pages (and/or other locally-hosted content) served by the web-server, circuitry 608 configured to perform authentication of users attempting to connect to the network via the mobile AP, circuitry 610 configured to capture and/or analyze data, and circuitry 612 for performing the routing/switching functions also performed by conventional access points. In an example implementation, the circuitry 762, 604, 606, 608, 610, and 612 may comprise one or more processors (e.g., x86 and/or ARM based), ASICs, PICs, FPGAs, memory, storage, and/or other hardware configured via software and/or firmware to realize the web-server, splash page management, authentication, and analytics circuitry.

Figure 7A:
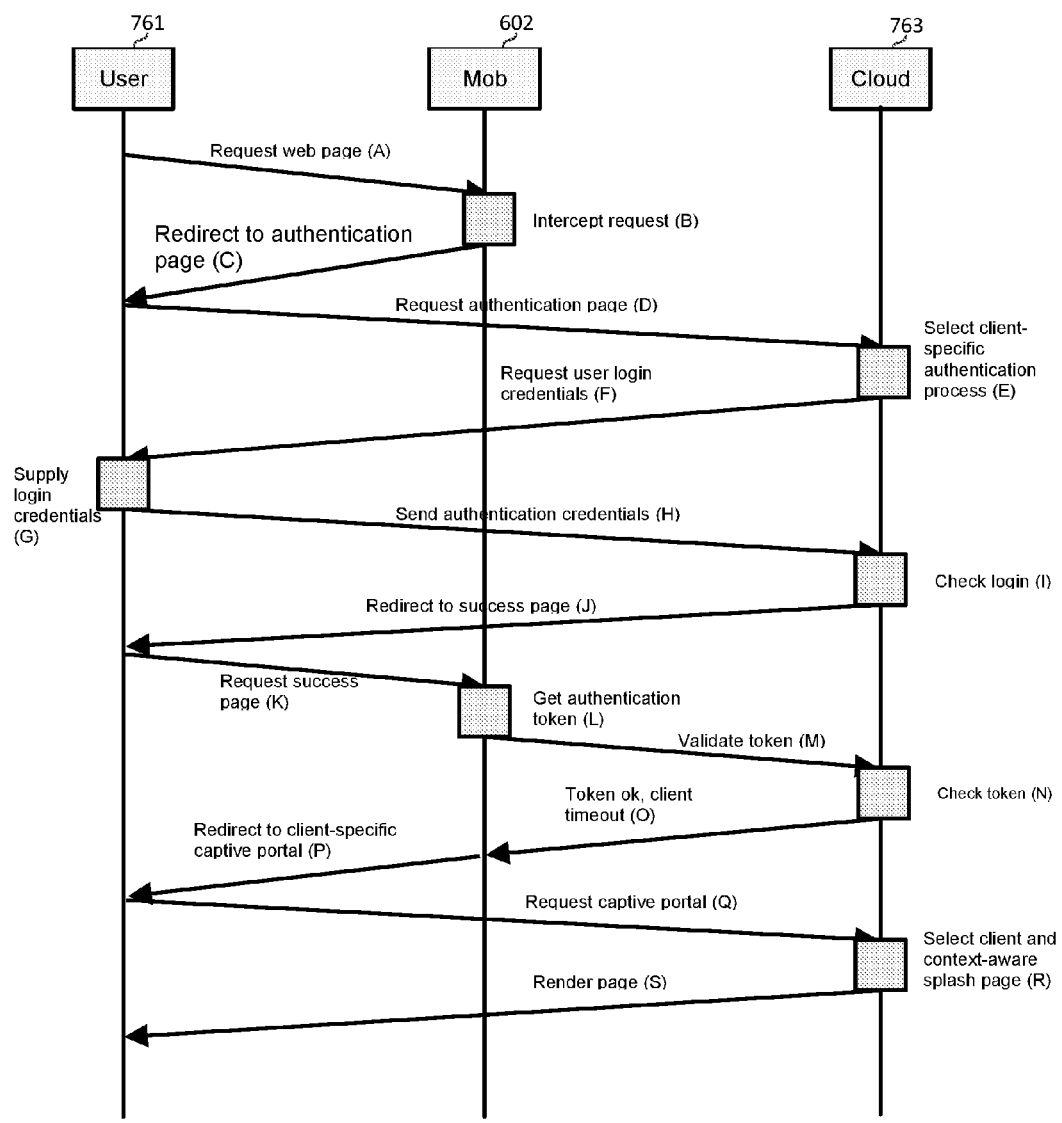
FIG. 7A depicts an example interaction of network devices in response to a user attempting to connect to the network of moving things.

FIG. 7A depicts an example interaction of network devices in response to a user attempting to connect to the network of moving things. At (A), a user device 761 connects to the mobile AP 762 (e.g., as described in FIG. 6B), and tries to access an Internet site. At (B), the request is intercepted by mobile AP 762. At (C), the mobile AP 762 redirects the user 761 to an authentication page. At (D), the User 761 requests the authentication page from the Cloud 763. At (E), depending on which affiliate(s) associated with the Mobile AP 762 is/are associated with the request, the Cloud 763 selects an affiliate-specific authentication process. In this regard, multiple affiliates may be supported per mobile AP, so that a user can be authenticated according to any particular affiliate's requirements (which may be independent of the Cloud 763, if desired by the particular affiliate).

At (F), the Cloud requests the User's login credentials. At (G), the User 761 supplies her login credentials. At (H), the entered login credentials are sent to the Cloud 763. At (I), the Cloud 763 checks if the credentials are correct. If the credentials are correct, then, at (J), the Cloud 763 redirects the User 761 to a success page, which is hosted in the Mobile AP. At (K), the User 761 requests the success page from the Mobile AP 762. At (L), the mobile AP 762 extracts the authentication token from the request. At (M), the mobile AP 762 requests the Cloud 763 to validate the token. At (N) the Cloud 763 validates the token. At (O), the Cloud 763 replies to the Mobile AP 762 that the token is correct and supplies a timeout value (which may be determined by a affiliate's service agreement/policy to be used for user 761. The Mobile AP 762 receives this information and, at (P) redirects the User 761 to a the captive portal. At (Q), the User 761 requests the captive portal, which in the example shown is hosted in the Cloud 763 but it can also be hosted in the Mobile AP 762 itself. At (R), the Cloud 763 selects a context-specific splash page. The context may determine the content of the splash page and/or the authentication methods used by the splash page. The context may, for example, comprise characteristics of the vehicle on which the Mobile AP 762 is installed (e.g., an affiliate associated with the vehicle (e.g., its operator), whether it is a bus, a train, etc.), the location of the Mobile AP 762 (e.g., its GPS coordinates, street address, etc.), the affiliate(s) associated with the request, characteristics of the user device 761 (e.g., its make, model, size, networking configurations, etc.), the current time, etc. At (S), the Cloud 763 serves the splash page to the User 761. After being shown this page, the User 761 is free to surf the Internet.

In another example implementation, (E), (F), (G), (I), (J), (N), (R), and (S), may be performed by the web-server, authentication management, and splash page management circuitry of the mobile AP 761, rather than the Cloud 763.

In another example implementation, (E), (F), (G), (I), (J), (N), (R), and (S), may be performed by circuitry of an affiliate's network.

In another example implementation, the captive portal may fallback to other authentication options in the case that the mobile AP 762 cannot connect to the Cloud 763. For example, if a mobile AP has a working Internet connection but is unable to establish a connection to the Cloud 763, the user authentication process may be done using a third-party solution, which allows users to continue being authenticated and user accounting information recorded.

Figure 7B:
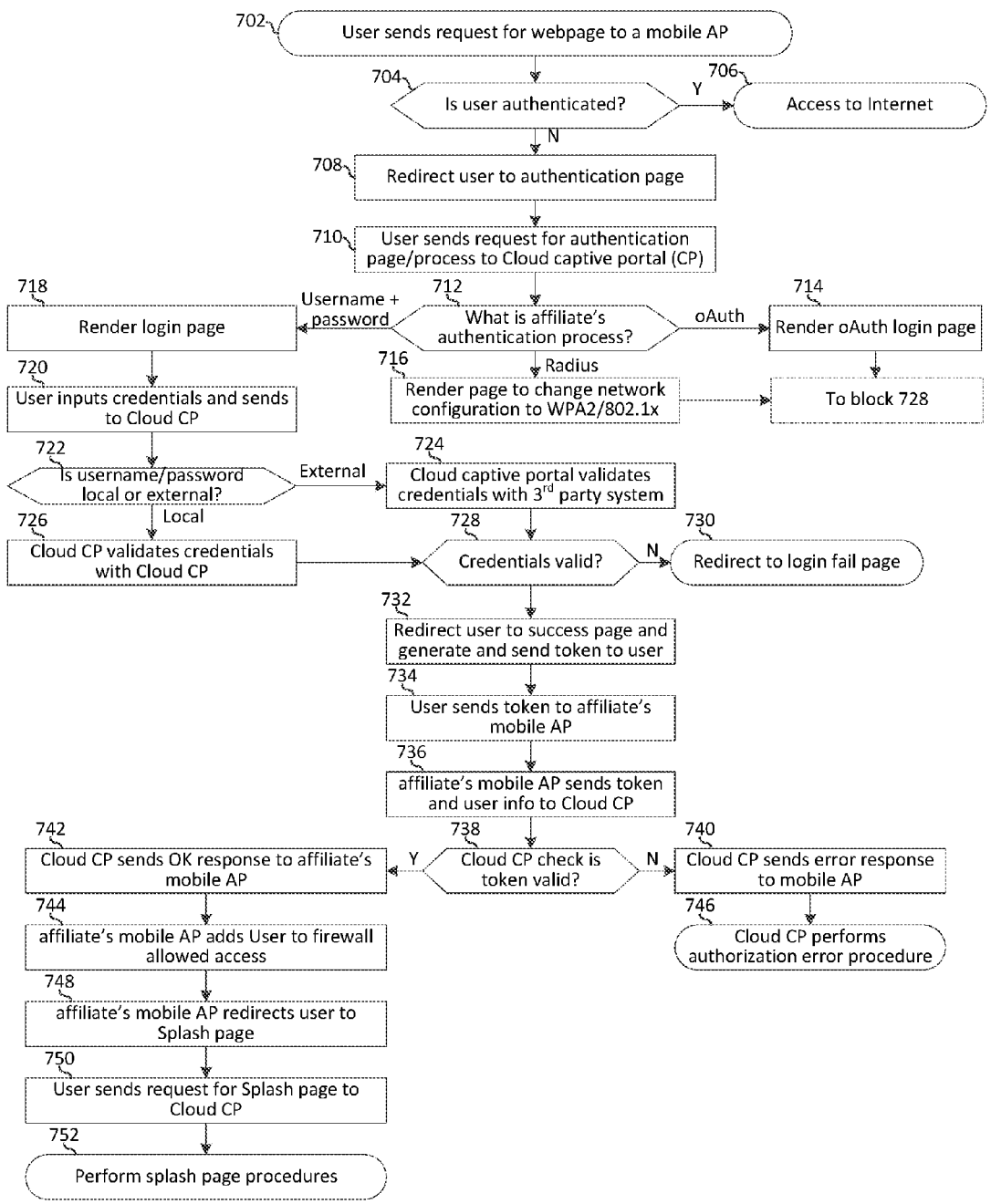
FIG. 7B is a flowchart of an example process of controlling user access to the network of FIG. 1.

FIG. 7B is a flowchart of an example process of controlling user access to the network of FIG. 1. The example process may, for example, be performed by any of the example networks or components 100, 200, 300, 400, 500-570, and 600, discussed herein.

In block 702, a user sends a request for webpage to an affiliate's mobile AP.

In block 704, the captive portal determines if the user is authenticated. If so, in block 706, the user is presented a context-specific splash screen indicating that the user is connected to the Internet. If not, the process advances to block 708.

In block 708, the user is redirected to a splash page.

In block 710, in response to the redirect, the user sends a request for the splash page/process to cloud-based captive portal (CP) 606.

In block 712, the captive portal determines what authentication method/process the affiliate has put in place. If the method is username and password, then the process advances to block 718.

In block 718, the captive portal renders a login page.

In block 720, the user inputs his/her credentials to the login page.

In block 722, the captive portal determines whether the username/password authentication is to be performed locally (i.e., credentials are stored in the cloud) or externally (credentials are stored in the affiliate's network). If the former, then the process advances to block 726 in which the captive portal validates the credentials using the authentication API of the cloud. From block 726 the process advances to block 728.

Returning to block 722, if the authentication is to be performed externally in the affiliate's network, the process advanced to block 724 in which the captive portal communicates with the affiliate's network to validate the credentials. From block 724 the process advances to block 728.

In block 728, if the credentials are invalid then the process advances to block 730 and the user is redirected to a login failure page.

Returning to block 728, if the credentials are valid, then the process advances to block 732. In block 732, the captive portal generates and sends a token to the user and redirects the user to a login success page.

In block 734, in response to the redirect, the user sends the token and a request for the success page to the mobile AP.

In block 736, the mobile AP sends the token and the user's credentials to the cloud-based captive portal.

In block 738, the token is validated. If it is valid, then the process advances to block 742 in which the captive portal sends an OK response to the affiliate's mobile AP and the process advances to block 744.

In block 744, the affiliate's mobile AP adds the user to its firewall to allow the user to access services provided via the mobile AP (e.g., access the Internet via the mobile AP).

In block 748, the mobile AP redirects the user to a splash page.

In block 750, in response to the redirect, the user requests the splash page from the captive portal.

In block 752, the captive portal performs splash page procedures (e.g., displays the splash screen for a determined period of time and then redirects to the webpage originally requested by the user in block 702).

Returning to block 738, if the token is invalid, then the process advances to block 740 in which the cloud-based captive portal sends an error response to the mobile AP. Then, in block 746, the cloud captive portal performs an authorization error procedure (e.g., displaying an error message and returning to block 702)

Returning to block 712, if the authentication method is oAuth (e.g., using a Facebook account, Google account, Amazon account etc. to login), then the process advances to block 714. In block 714, the captive portal renders the oAuth login page (e.g., displays links to a variety of external authentication methods). The user may select one of the methods, the authentication may take place and the external service may return a response indicating whether the user's credentials are valid. The process may then advance to block 728.

Returning to block 712, if the authentication process is geographic radius, then the process advances to block 716. In block 716, the captive portal renders a page to cause, or instruct the user to, reconfigure its device for WPA2/802.1x authentication which may be performed by a third-party server. After block 716, the process may proceed to block 728.

Figure 8:
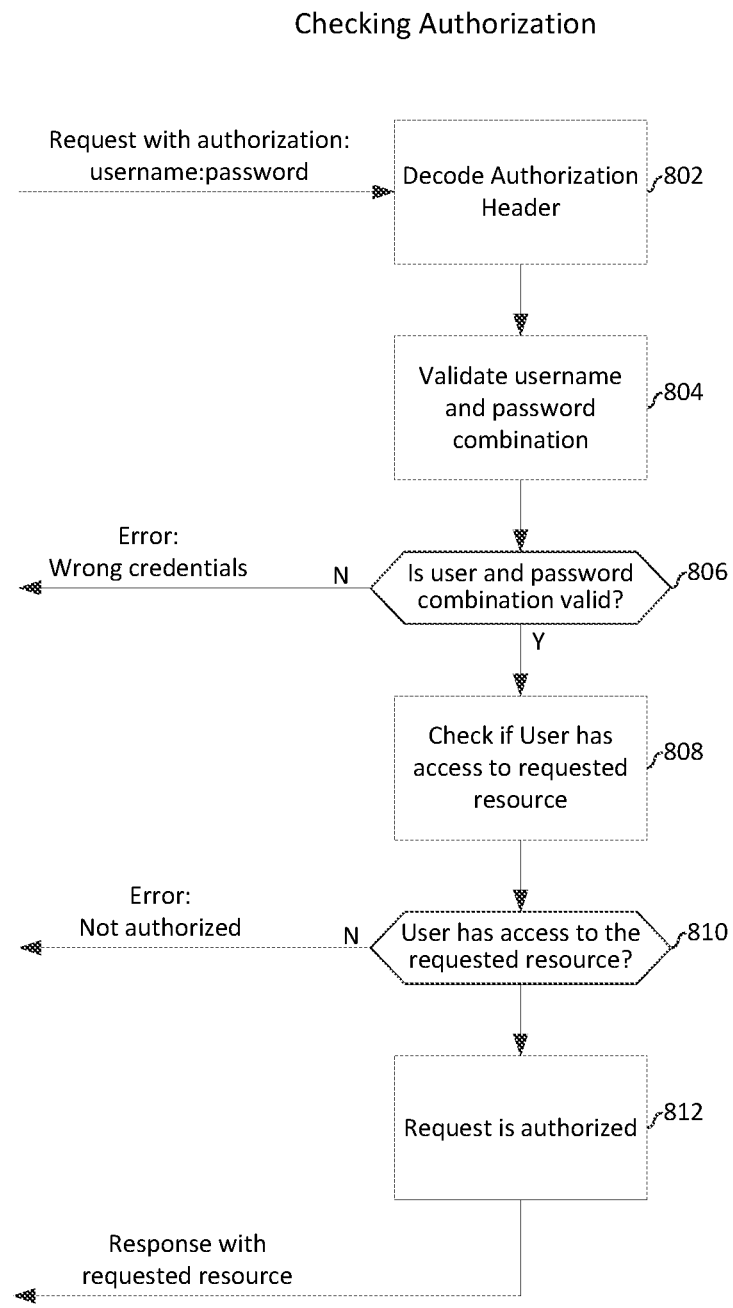
FIG. 8 shows an example process for using username and password combination as an authorization mechanism to access an API of the Cloud of FIG. 1.

An example process for using username and password combination as an authorization mechanism to access an API is shown in FIG. 8. The process begins with a request having an authorization method of username and password being received. In block 802, the authorization header of the request is decoded. In block 804, the username and password combination is validated. In block 806, if the username and password combination is invalid then a reply indicating wrong credentials is generated. If the username and password combination is correct then in blocks 808 and 810 circuitry of the Cloud checks a database to see if the user has access to the resource it is requesting. If not, then a reply indicating the user is not authorized is generated. If the user is authorized, then in block 812 the request is authorized and the requested resource is provided.

In an example implementation, every request to the API must include an access token that will later be used to validate the rightful access to the requested resource. An API access token, besides the mandatory headers defined in RFC 7519, may include, for example, the name of the issuer of the token and the expiration date of the token. The access token may be generated using either an API management dashboard or through the Authentication API. A user must be authorized before being provided access to perform operations such as requesting a new access token, revoking an access token, and renewing the expiration date of an access token. Access tokens may be stored securely in a database accessible only to circuitry of the Cloud.

Figure 9:
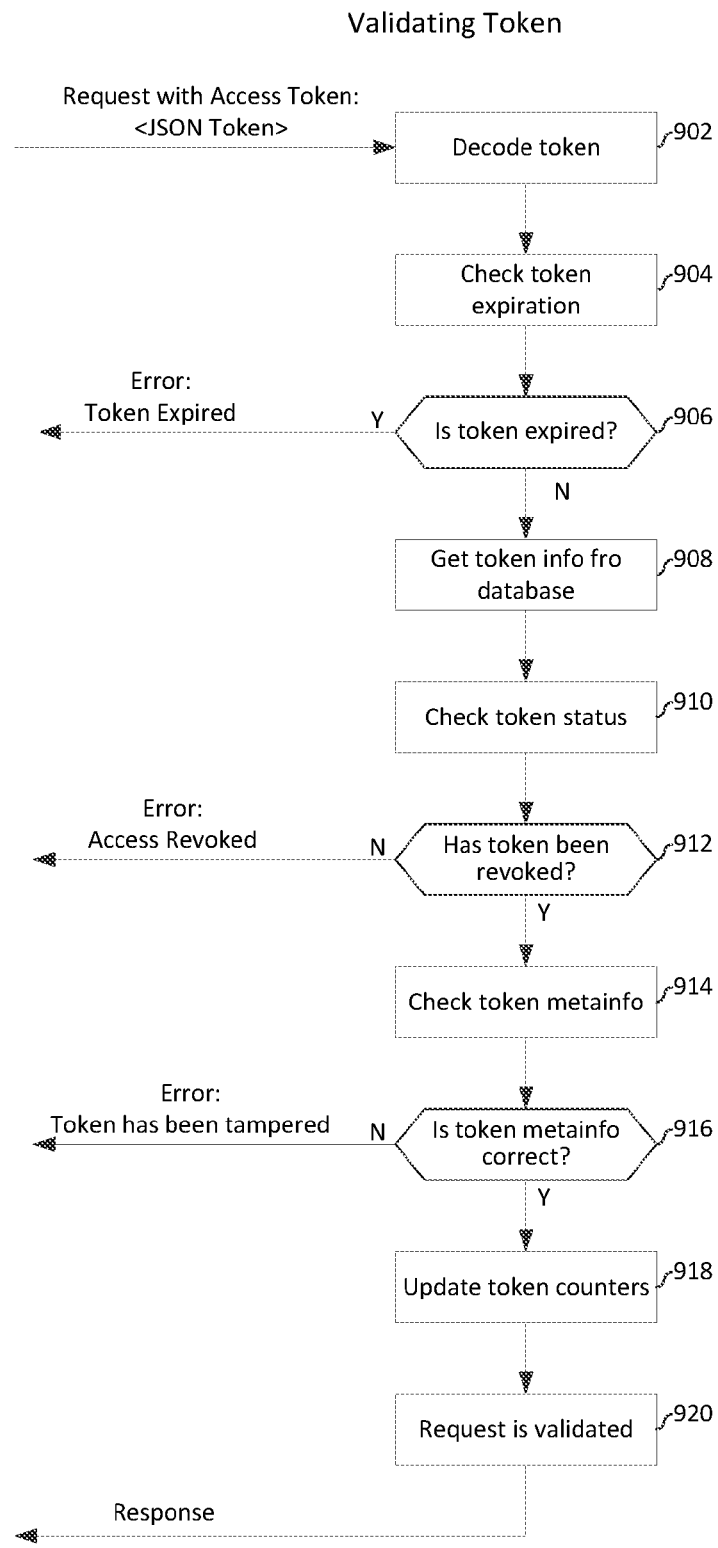
FIG. 9 shows an example process of using a token to validate the access to an API resource.

FIG. 9 shows an example process of using a token to validate the access to an API resource. The process begins with a request accompanied by an access token being received. The access token may, for example, be in JSON format. In block 902, the token is decoded. In block 904 the expiration date of the token is checked. In block 906, if the token has expired, then an error reply indicating the token is expired is generated. If the token is not expired, then in block 908, token information is retrieved from a database accessible to the Cloud. In block 910, the retrieved information is used to determine whether the token has been revoked. If so, then in block 912 an error reply indicating revocation of the token is generated. If not, then in block 914 the token is inspected to see if it has been tampered with. If so, then an error reply is generated. If not, then in block 918 token counters are updated. In block 920, the request is validated and a response providing the requested resource is generated.

Figure 10A:
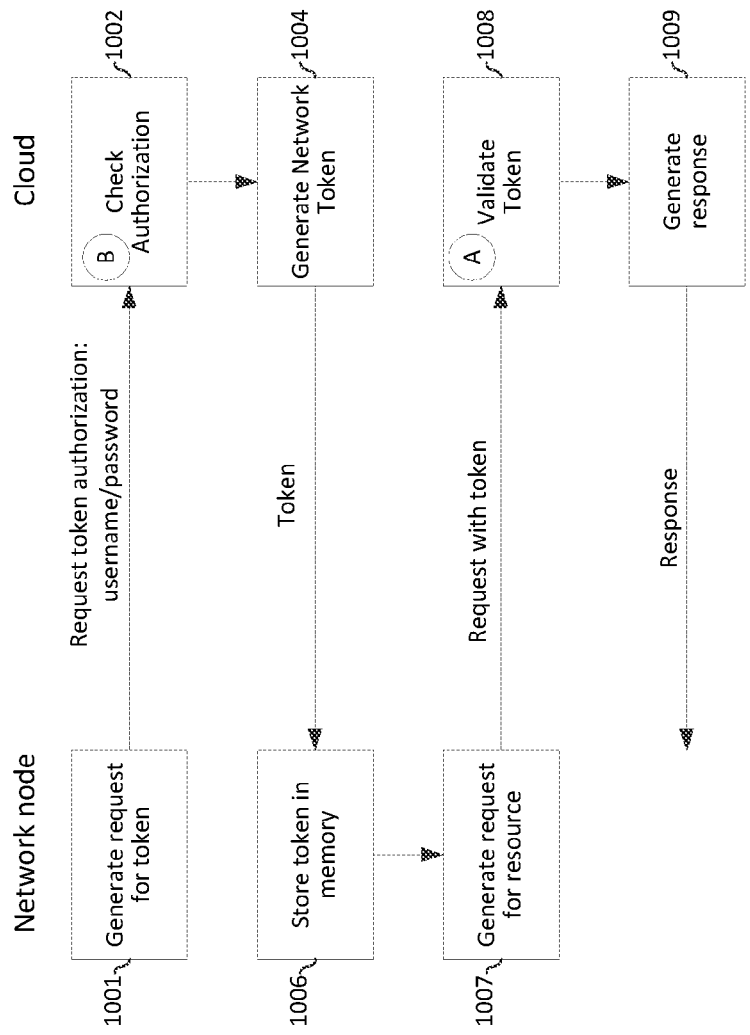
FIGS. 10A and 10B shows the differences and similarities of requesting an API token in two different domains.
Figure 10B:
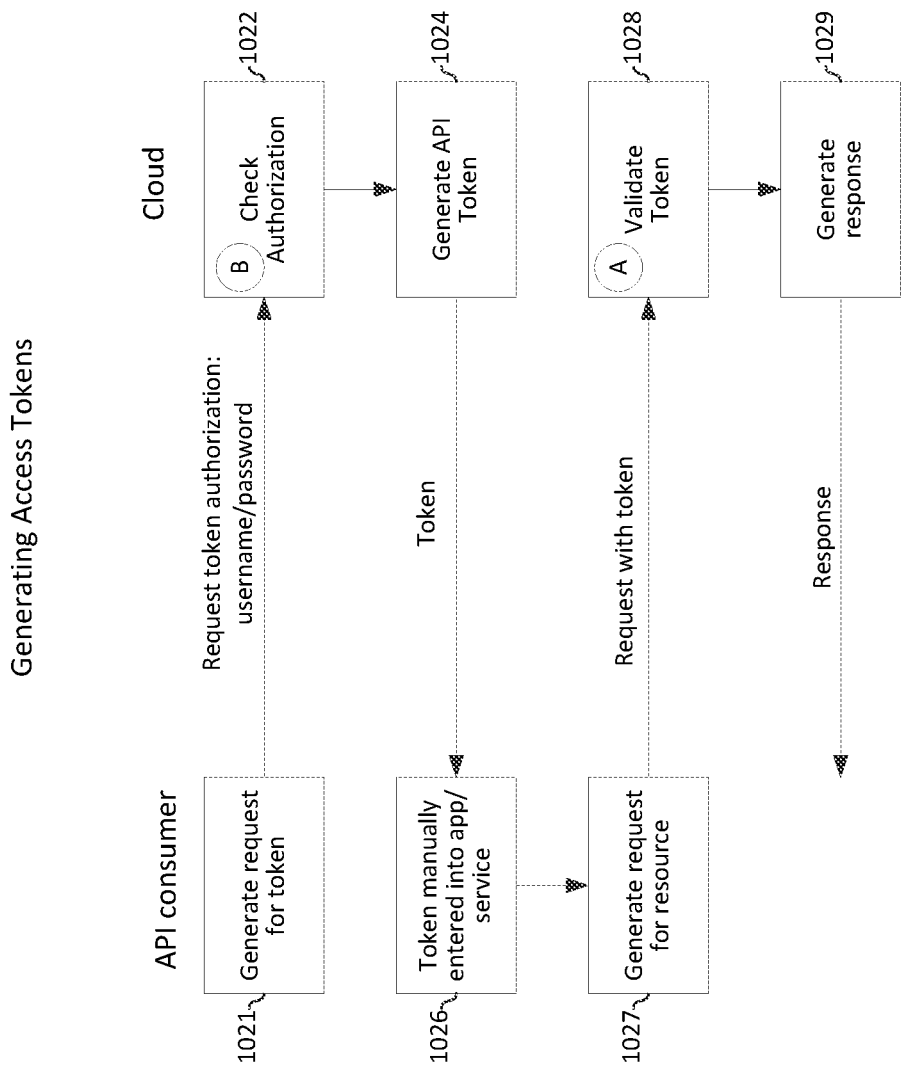

In an example implementation, tokens can have two different domains: (1) API consumer domain; and (2) network node domain. For the first domain, an application or service interacts with the API and the token is programmed into the application by a user that manually or automatically requests a token to the API. In the second domain, a network node automatically requests a token to the API and uses that same token to interact in any remaining API requests. FIGS. 10A and 10B illustrate the differences and similarities of requesting an API token in two different domains.

In FIG. 10A is shown the network node domain. The process begins with block 1001 in which the network node sends a request for a token. The request indicates that username and password is the method of authorization. In block 1002, the username and password combination received in the request is validated by circuitry of the Cloud to confirm that the network node is authorized to receive a token. In block 1004 a network token is generated, stored to a database in the Cloud, and sent to the network node. In block 1006 the token is received by the network node and stored in memory. In block 1007 the network node generates a request and sends it to the Cloud, the request includes the token. In block 1008, the resource request from the network node is received by circuitry of the Cloud. The circuitry of the cloud validates the token. If the token is valid, then in block 1009 the cloud provides the requested resource in a response.

In FIG. 10B is shown the API consumer domain. The process begins with block 1021 in which the API generates and sends a request for a token. The request indicates that username and password is the method of authorization. For example, block 1021 may be triggered by a user typing in a username and password into a mobile application or web browser. In block 1022, the username and password combination received in the request is validated by the Cloud to confirm that the API consumer is authorized to receive a token. In block 1024 an API token is generated, stored to a database in the Cloud, and transmitted to the API consumer. In block 1026, the received API token is manually entered (e.g., typed and/or copy-pasted) into an application/service (e.g., a mobile application or browser based application). In block 1027, the application/service generates and sends a request for a resource and includes the API token with the request. In block 1028, the Cloud receives the request and validates the token. If the token is valid, the Cloud provides the requested resource in a response.

Figure 11:
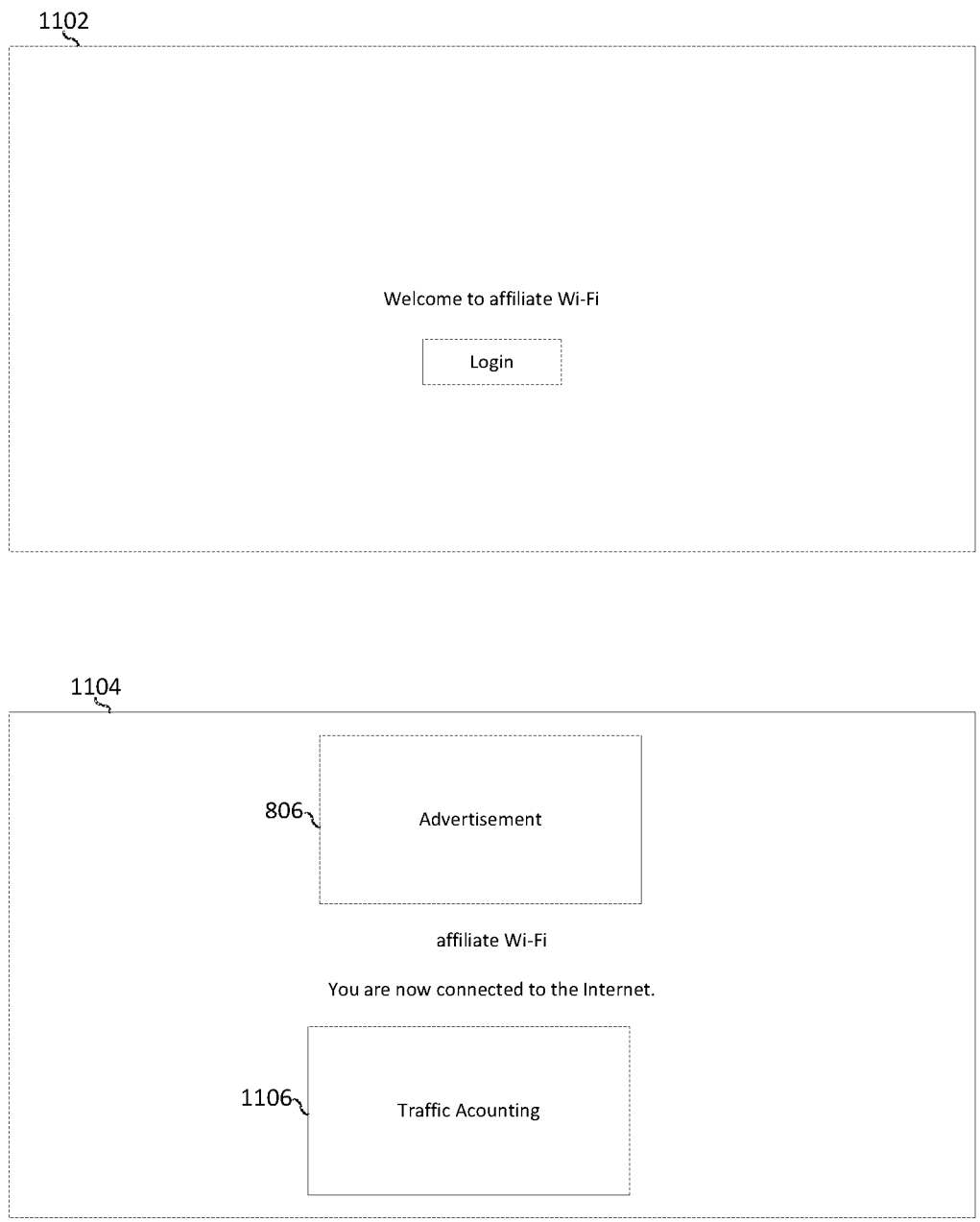
FIG. 11 shows example splash pages of a captive portal.

FIG. 11 shows example splash pages of the captive portal. The splash page 702 may be presented when a user first attempts to access the network 100. The splash page 704 may be presented upon the user being validated.

The captive portal may enable affiliates and/or any other third-parties to have a visual presence whenever a user joins the network with a splash screen to display information such ads, logos, etc. Some Wi-Fi networks require registration and/or user credentials to access them. The captive portal supports multiple registration and authentication mechanisms to meet different affiliate requirements. The captive portal may enable affiliates to show content-aware and user-oriented content in splash screens. The captive portal may enable affiliates to measure and monitor network use by users and devices. Some affiliates may already have existing splash pages on servers that they control; the captive portal supports displaying content from such servers.

The captive portal allows (e.g., via analytics circuitry 610 of a mobile AP) user sessions to be tracked for later analysis. The captive portal allows differentiated behavior according to a set of factors such as, for example, geographic location, session-time, based on which train/bus/etc. the user is on, the current or next stop of the bus/train/etc., number and type of connected users in the same bus/train/etc., number of connected users nearby on the street, whether the bus/train is on time, or any other factor. Which factors are used for the differentiated behavior may be configurable per-ISP, persponsor, etc. This behavior may be, for example, which splash page the user sees, which ads the user sees, how often a splash screen is redisplayed, etc. The captive portal may allow support for multiple affiliates in the same mobile AP, meaning that different users may see different behavior (e.g., gain access to different networks and/or services) according to the group they belong to. The captive portal may support asynchronous communication between the portal and servers used for authentication and content delivery. The captive portal may provide the ability to create geo-caged and time-sensitive campaigns provided to the users using context and enhanced-context aware content. The captive portal is able to cope with multiple affiliates and fleet types at the same time. The captive portal is able to display splash pages that are hosted in the affiliate's IT premises and fully owned and controlled by the affiliate. The captive portal is operable to distribute local content to be cached and hosted locally in the vehicle in the Mobile AP.

Figure 12:
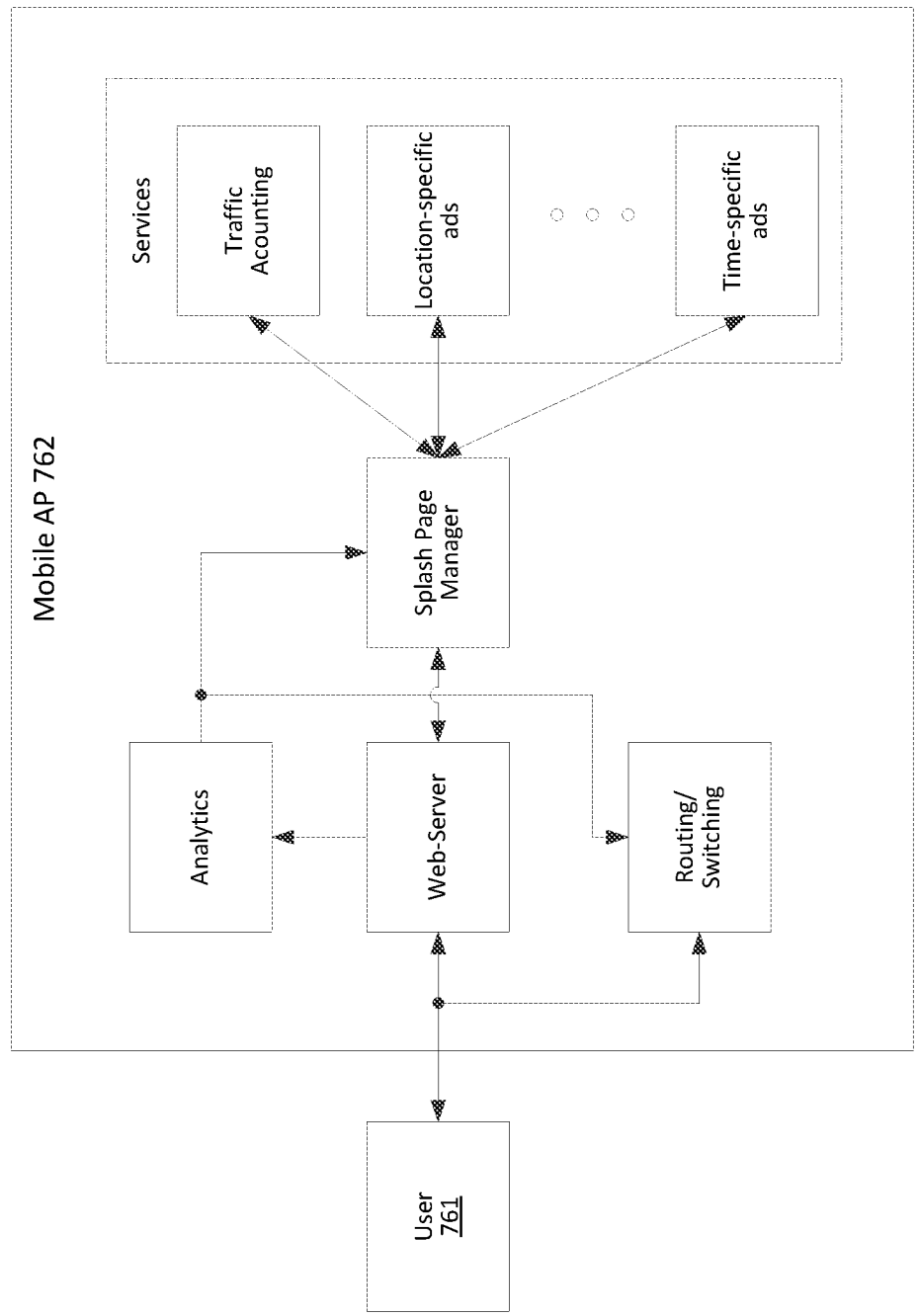
FIG. 12 illustrates a mobile AP configured to provide differentiated services.

FIG. 12 illustrates the use of data captured by a captive portal for providing differentiated services. Again shown in FIG. 12 are the user 761 and the mobile AP 762. In another example implementation, at least a portion of one or more of the analytics circuitry, splash page management circuitry, and services shown as residing in the mobile AP 762 may instead reside in the Cloud 763 and/or an affiliate's network. In operation, when the user 761 connects to the mobile AP 762, the analytics circuitry 610 inspects traffic to and/or from the user 762 to determine context information about the User 761. Such context information may include, for example, the type of traffic it is, or desires to, communicate; the type of equipment it is (e.g., make, model, OS, etc.); its location, an affiliate it is associated with, and/or the like. The analytics circuitry 610 provides this context information to the splash-page management circuitry 606 which uses the information to decide which information to present to the user on a splash screen (or toolbar etc. of the captive portal). Based in the information provided by the analytics circuitry 610, and/or based on a configuration selected by the user and/or an affiliate, the splash page management circuitry 606 accesses one or more services configured to provide information which may be displayed on a splash screen/toolbar/ etc. Examples of such services include: a traffic accounting service, and an advertisement service. The traffic accounting service may provide the user information such as how much data it has used and/or how much data it has left to use before hitting a cap, fee, or the like. The advertising services may be configured to provide customized ads which may be location specific, time specific, and/or otherwise specific to the user 761 based on the context information from the analytics circuitry.

In addition to splash page/toolbar/etc. content being managed based on the context information, services provided to the user 761 and/or routing/switching functions provided by the AP 762 may also be managed based on the context information. For example, the context information may be used to provide geographic service limitations. Different affiliates may have different service offerings and the mobile AP 762 may be configured to check this in real time and provide service in accordance with a affiliate's service agreements/preferences/requirements based on location (e.g., when user 761 is outside a service area of its mobile carrier the mobile AP may refuse Internet access to the user 761, as required by an agreement between the mobile carrier and the operator of the mobile AP). As another example, the number of users connected to the mobile AP at any given time may be restricted per agreement with each affiliate of the network of moving things. For instance, when the mobile AP 762 is outside a coverage area of fixed APs of the network of moving things, the costs of communicating affiliate traffic over a cellular connection may be passed on to the affiliates. To limit these charges, a client may limit which of the client's devices (e.g., only devices of particular types/models/etc., only devices on particular vehicles, only devices of particular subscribers/subscriber plans, etc.) which are permitted to be connected to the mobile AP 762 in areas outside of that affiliate's coverage area, a maximum number of the affiliate's devices that are permitted to be concurrently connected to the mobile AP 762 in areas outside the affiliate's coverage-area, maximum amount (instantaneous or aggregate) of traffic to/from the affiliate's devices that is permitted in areas that are outside of the affiliate's coverage area, and/or the like. As another example, an affiliate may desire to offer free access to the Internet for a limited period of time and after this time has expired, the user is asked to either input login credentials to continue accessing the Internet, or execute a payment to continue. The mobile AP 762 can handle this on behalf of the affiliate and pass subsequent billing information onto the affiliate.

The cloud-based captive portal provides an API that gives affiliates the ability to: upload a new content (logo, text, HTML, CSS, and/or the like) to be displayed on a splash screen, modify a selected authentication mechanism, modify selected authentication configurations, change user registration mechanism, define time-limited and geo-limited campaigns (e.g., each campaign may have corresponding splash screen content, discounts. Services, etc.), change external Splash Page destination URL, update Terms and Conditions for using affiliate resources, change affiliate timeout periods, and/or the like. The cloud-based captive portal may be configured to redirect to custom Splash Pages which may be hosted on an affiliate-controlled server. In such an instance, the captive portal may handle all authentication steps and, once complete, redirect to the affiliate's page. The cloud-based Captive Portal 606 may interact with a captive portal running in a mobile access point to perform affiliate authentication steps and display desired the splash page.

A cloud-based captive portal in accordance with various aspects of this disclosure allows for multiple authentication, authorization and accounting mechanisms for captive portal access control. The cloud-based captive portal in accordance with various aspects of this disclosure provides resources/ interfaces for the creation of time-limited and geo-limited campaigns. A cloud-based captive portal in accordance with various aspects of this disclosure leverage connected vehicles unique characteristics to enhance captive portal's displayed content with context-aware and enhanced-context aware content. The cloud-based captive portal in accordance with various aspects of this disclosure allows provides the affiliate with control over the campaigns and the content presented to users. A cloud-based captive portal in accordance with various aspects of this disclosure allows provide a three-entity (Mobile device, mobile AP, and Captive Portal server) validation of access to the Internet. Unlike captive portals designed for fixed locations, the cloud based captive-portal described herein is able to receive information from the vehicles like the number and profile of connected users, the intended destination of the vehicle, the type of vehicle, as well as many others. That information allows for the creation of a more tailored experience of the content displayed to the end users.

In accordance with an example implementation of this disclosure, a request from a mobile access point (e.g., 762) that is installed on a vehicle may be received via network interface circuitry of one or more computing devices (e.g., computing devices of the Cloud of FIG. 1). Processing circuitry of the one or more computing devices (e.g., one or more processors and memory of the servers hosting the Cloud) may determine characteristics of a captive portal to present in response to the request based on current location (e.g., determined based on GPS coordinates and/or which other access points are in-range) of the vehicle and mobile access point. A captive portal with the determined characteristics is then provided by the processing circuitry, via the network interface circuitry, in response to the request. The characteristics of the captive portal may comprise visual and/or audio content of the captive portal. The visual and/or audio content may comprise traffic accounting information for a user device from which the request originated. The visual and/or audio content of the captive portal may be determined based on a predetermined route of the vehicle (e.g., a public bus route, train route, shipping route, etc.). The characteristics of the captive portal may be based on whether the vehicle is on schedule, behind schedule, or ahead of schedule on its route. The characteristics of the captive portal may be determined based on a speed of the vehicle. The characteristics of the captive portal may be determined based on an affiliate associated with the mobile access point (e.g., different captive portal characteristic(s) may be determined for a mobile access point of a bus operator than for a mobile access point of a train operator). The characteristics of the captive portal may be determined based on which of a plurality of network providers associated with the mobile access point provided a backhaul connection to the mobile access point for backhauling the request (e.g., different captive portal characteristics may be determined when the mobile access point is backhauled over a cellular connection provided by a first network provider than when the mobile access point is backhauled over a WiFi connection to a fixed access point provided by a second network provider.) The characteristics of the captive portal may comprise an authentication technique to be used for authenticating a user device on behalf of which the request was sent. The authentication technique may be selected from a set of techniques including username and password, and oAuth. The characteristics of the captive portal may be determined based on characteristics of a user device on behalf of which the request was sent. The characteristics of the user device may comprise an expected location at which the user device will de-board the vehicle. The characteristics of the user device may comprise whether the user device transferred from another vehicle within a determined amount of time of the current time. The processing circuitry may provide, via the networking circuitry, a plurality of application programming interfaces (APIs), wherein access to each one of the plurality of APIs is controlled separately from access to each other one of the plurality of APIs. Access to one or more of the plurality of APIs may be restricted to a user device associated with an operator of the vehicle (e.g., a first API may be available only to a user device of the bus driver whereas a second API may be available user devices of passengers on the bus).

In summary, various aspects of this disclosure provide communication network architectures, systems and methods for interfacing with a network of moving things. As a non-limiting example, various aspects of this disclosure provide communication network architectures, systems, and methods for supporting a communication network comprising a complex array of both static and moving communication nodes (e.g., the Internet of moving things). While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

The invention claimed is:

1. A method comprising:
   receiving, via network interface circuitry of one or more computing devices, a request from a mobile access point that is installed on a vehicle;
   determining, by processing circuitry of the one or more computing devices, characteristics of a captive portal to present in response to the request based on current location of the vehicle and mobile access point, wherein the characteristics of the captive portal comprise visual and/or audio content of the captive portal, wherein the visual and/or audio content comprises traffic accounting information for a user device from which the request originated, and wherein the visual and/or audio content of the captive portal is determined based on a predetermined route of the vehicle; and
   providing, by the processing circuitry via the network interface circuitry, the captive portal with the determined characteristics in response to the request.

2. The method of claim 1, comprising determining, by the processing circuitry of the one or more computing devices, the characteristics of the captive portal based on the predetermined route of the vehicle.

3. The method of claim 1, comprising determining, by the processing circuitry of the one or more computing devices, the characteristics of the captive portal based on a speed of the vehicle.

4. The method of claim 1, comprising determining, by the processing circuitry of the one or more computing devices, the characteristics of the captive portal based on whether the vehicle is on schedule, behind schedule, or ahead of schedule on its route.

5. The method of claim 1, comprising determining, by the processing circuitry of the one or more computing devices, the characteristics of the captive portal based on an affiliate associated with the mobile access point.

6. The method of claim 1, comprising determining, by the processing circuitry of the one or more computing devices, the characteristics of the captive portal based on which of a plurality of network providers associated with the mobile access point provided a backhaul connection to the mobile access point for backhauling the request.

7. The method of claim 1, wherein the characteristics of the captive portal comprise an authentication technique to be used for authenticating a user device on behalf of which the request was sent.

8. The method of claim 7, wherein the authentication technique is selected from a set of techniques including username and password, and oAuth.

9. The method of claim 1, comprising determining, by the processing circuitry of the one or more computing devices, the characteristics of the captive portal based on characteristics of a user device on behalf of which the request was sent.

10. The method of claim 9, wherein the characteristics of the user device comprise an expected location at which the user device will de-board the vehicle.

11. The method of claim 9, wherein the characteristics of the user device comprise whether the user device transferred from another vehicle within a determined amount of time of the current time.

12. The method of claim 1, comprising:
providing, by the processing circuitry, a plurality of application programming interfaces (APIs) wherein access to each one of the plurality of APIs is controlled separately from access to each other one of the plurality of APIs.

13. The method of claim 12, comprising restricting access to one or more of the plurality of APIs to a user device associated with an operator of the vehicle.

14. A method comprising:
receiving, via network interface circuitry of one or more computing devices, a request from a mobile access point that is installed on a vehicle;
determining, by processing circuitry of the one or more computing devices, characteristics of a captive portal to present in response to the request based on a current location of the vehicle and mobile access point and based on a predetermined route of the vehicle; and
providing, by the processing circuitry via the network interface circuitry, the captive portal with the determined characteristics in response to the request.

15. The method of claim 14, comprising determining, by the processing circuitry of the one or more computing devices, the characteristics of the captive portal based on a speed of the vehicle.

16. The method of claim 14, comprising determining, by the processing circuitry of the one or more computing devices, the characteristics of the captive portal based on whether the vehicle is on schedule, behind schedule, or ahead of schedule on its route.

17. The method of claim 14, comprising determining, by the processing circuitry of the one or more computing devices, the characteristics of the captive portal based on an affiliate associated with the mobile access point.

18. The method of claim 14, comprising determining, by the processing circuitry of the one or more computing devices, the characteristics of the captive portal based on which of a plurality of network providers associated with the mobile access point provided a backhaul connection to the mobile access point for backhauling the request.

19. The method of claim 14, wherein the characteristics of the captive portal comprise an authentication technique to be used for authenticating a user device on behalf of which the request was sent.

20. The method of claim 19, wherein the authentication technique is selected from a set of techniques including username and password, and oAuth.

21. The method of claim 14, comprising determining, by the processing circuitry of the one or more computing devices, the characteristics of the captive portal based on characteristics of a user device on behalf of which the request was sent.

22. The method of claim 21, wherein the characteristics of the user device comprise an expected location at which the user device will de-board the vehicle.

23. The method of claim 21, wherein the characteristics of the user device comprise whether the user device transferred from another vehicle within a determined amount of time of the current time.

24. The method of claim 14, comprising:
providing, by the processing circuitry, a plurality of application programming interfaces (APIs) wherein access to each one of the plurality of APIs is controlled separately from access to each other one of the plurality of APIs.

25. The method of claim 24, comprising restricting access to one or more of the plurality of APIs to a user device associated with an operator of the vehicle.

26. A method comprising:
receiving, via network interface circuitry of one or more computing devices, a request from a mobile access point that is installed on a vehicle;
determining, by processing circuitry of the one or more computing devices, characteristics of a captive portal to present in response to the request based on current location of the vehicle and mobile access point and based on whether the vehicle is on schedule, behind schedule, or ahead of schedule on its route; and
providing, by the processing circuitry via the network interface circuitry, the captive portal with the determined characteristics in response to the request.

27. The method of claim 26, comprising determining, by the processing circuitry of the one or more computing devices, the characteristics of the captive portal based on a speed of the vehicle.

28. The method of claim 26, comprising determining, by the processing circuitry of the one or more computing devices, the characteristics of the captive portal based on an affiliate associated with the mobile access point.

29. The method of claim 26, comprising determining, by the processing circuitry of the one or more computing devices, the characteristics of the captive portal based on which of a plurality of network providers associated with the mobile access point provided a backhaul connection to the mobile access point for backhauling the request.

30. The method of claim 26, wherein the characteristics of the captive portal comprise an authentication technique to be used for authenticating a user device on behalf of which the request was sent.

31. The method of claim 26, wherein the authentication technique is selected from a set of techniques including username and password, and oAuth.

32. The method of claim 26, comprising determining, by the processing circuitry of the one or more computing devices, the characteristics of the captive portal based on characteristics of a user device on behalf of which the request was sent.

33. The method of claim 32, wherein the characteristics of the user device comprise an expected location at which the user device will de-board the vehicle.

34. The method of claim 32, wherein the characteristics of the user device comprise whether the user device transferred from another vehicle within a determined amount of time of the current time.

35. The method of claim 26, comprising:
providing, by the processing circuitry, a plurality of application programming interfaces (APIs) wherein access to each one of the plurality of APIs is controlled separately from access to each other one of the plurality of APIs.

36. The method of claim 35, comprising restricting access to one or more of the plurality of APIs to a user device associated with an operator of the vehicle.

37. A method comprising:
receiving, via network interface circuitry of one or more computing devices, a request from a mobile access point that is installed on a vehicle;
determining, by processing circuitry of the one or more computing devices, characteristics of a captive portal to present in response to the request based on current location of the vehicle and mobile access point and based on characteristics of a user device on behalf of which the request was sent, and wherein the characteristics of the user device comprise an expected location at which the user device will de-board the vehicle; and providing, by the processing circuitry via the network interface circuitry, the captive portal with the determined characteristics in response to the request.

38. The method of claim 37, comprising determining, by the processing circuitry of the one or more computing devices, the characteristics of the captive portal based on a speed of the vehicle.

39. The method of claim 37, comprising determining, by the processing circuitry of the one or more computing devices, the characteristics of the captive portal based on an affiliate associated with the mobile access point.

40. The method of claim 37, comprising determining, by the processing circuitry of the one or more computing devices, the characteristics of the captive portal based on which of a plurality of network providers associated with the mobile access point provided a backhaul connection to the mobile access point for backhauling the request.

41. The method of claim 37, wherein the characteristics of the captive portal comprise an authentication technique to be used for authenticating a user device on behalf of which the request was sent.

42. The method of claim 41, wherein the authentication technique is selected from a set of techniques including username and password, and oAuth.

43. The method of claim 37, wherein the characteristics of the user device comprise whether the user device transferred from another vehicle within a determined amount of time of the current time.

44. The method of claim 37, comprising:
providing, by the processing circuitry, a plurality of application programming interfaces (APIs) wherein access to each one of the plurality of APIs is controlled separately from access to each other one of the plurality of APIs.

45. The method of claim 44, comprising restricting access to one or more of the plurality of APIs to a user device associated with an operator of the vehicle.

46. A method comprising:
receiving, via network interface circuitry of one or more computing devices, a request from a mobile access point that is installed on a vehicle;
determining, by processing circuitry of the one or more computing devices, characteristics of a captive portal to present in response to the request based on current location of the vehicle and mobile access point and based on characteristics of a user device on behalf of which the request was sent, wherein the characteristics of the user device comprise whether the user device transferred from another vehicle within a determined amount of time of the current time; and
providing, by the processing circuitry via the network interface circuitry, the captive portal with the determined characteristics in response to the request.

47. The method of claim 46, comprising determining, by the processing circuitry of the one or more computing devices, the characteristics of the captive portal based on a speed of the vehicle.

48. The method of claim 46, comprising determining, by the processing circuitry of the one or more computing devices, the characteristics of the captive portal based on an affiliate associated with the mobile access point.

49. The method of claim 46, comprising determining, by the processing circuitry of the one or more computing devices, the characteristics of the captive portal based on which of a plurality of network providers associated with the mobile access point provided a backhaul connection to the mobile access point for backhauling the request.

50. The method of claim 46, wherein the characteristics of the captive portal comprise an authentication technique to be used for authenticating a user device on behalf of which the request was sent.

51. The method of claim 50, wherein the authentication technique is selected from a set of techniques including username and password, and oAuth.

52. The method of claim 46, comprising:
providing, by the processing circuitry, a plurality of application programming interfaces (APIs) wherein access to each one of the plurality of APIs is controlled separately from access to each other one of the plurality of APIs.

53. The method of claim 52, comprising restricting access to one or more of the plurality of APIs to a user device associated with an operator of the vehicle.

* * * * *